E. K. BAKER.
METHOD OF AND MEANS FOR PRODUCING TIRE CARCASS MATERIAL.
APPLICATION FILED NOV. 10, 1917.
1,355,525.
Patented Oct. 12, 1920.
4 SHEETS—SHEET 2.
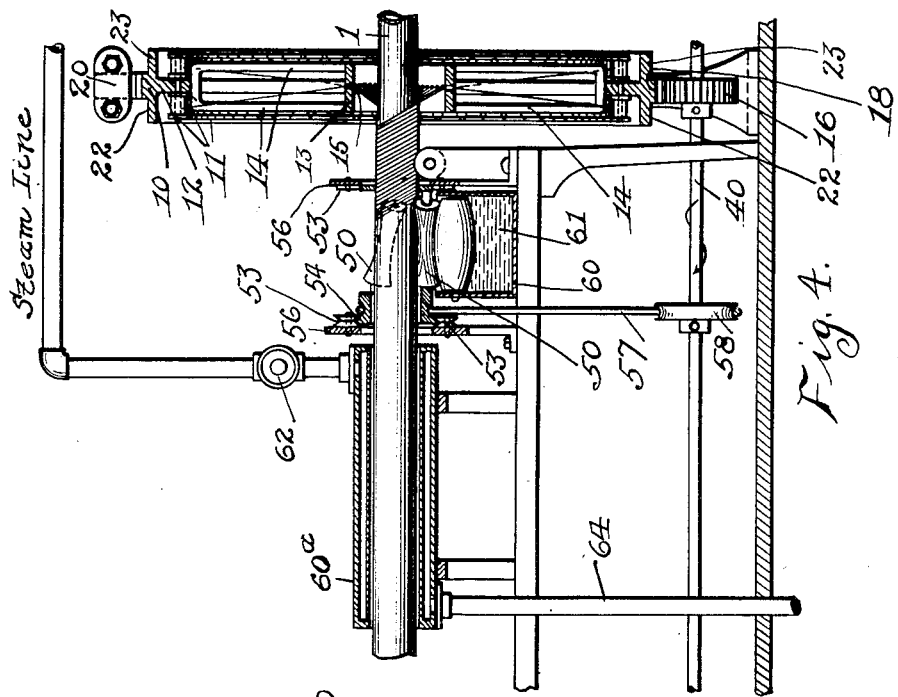
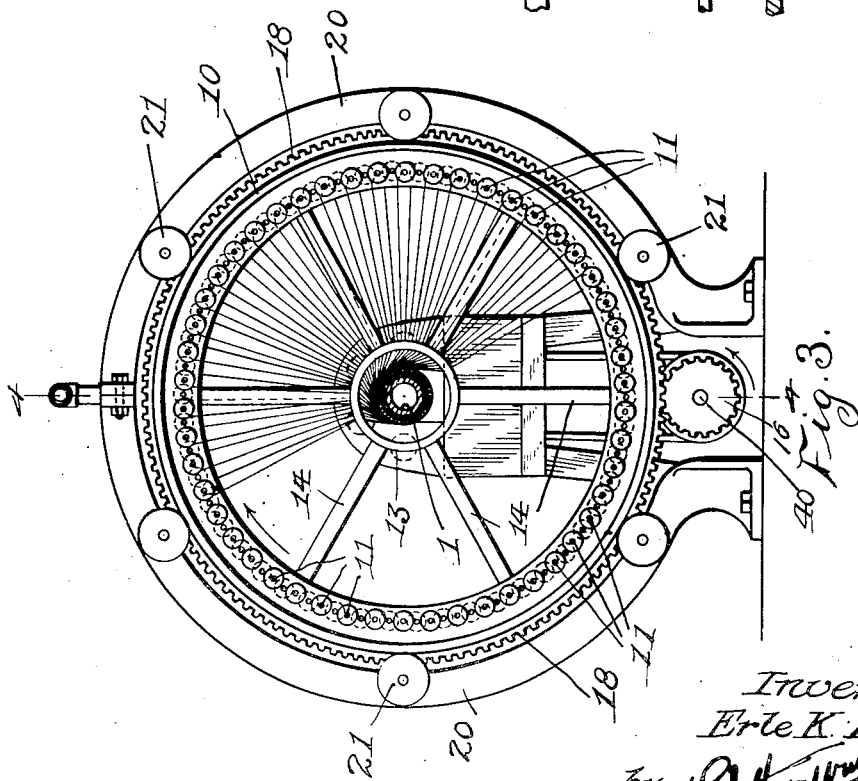
Inventor
Erle K. Baker E. K. BAKER.
METHOD OF AND MEANS FOR PRODUCING TIRE CARCASS MATERIAL.
APPLICATION FILED NOV. 10, 1917.
1,355,525. Patented Oct. 12, 1920.
4 SHEETS—SHEET 3.
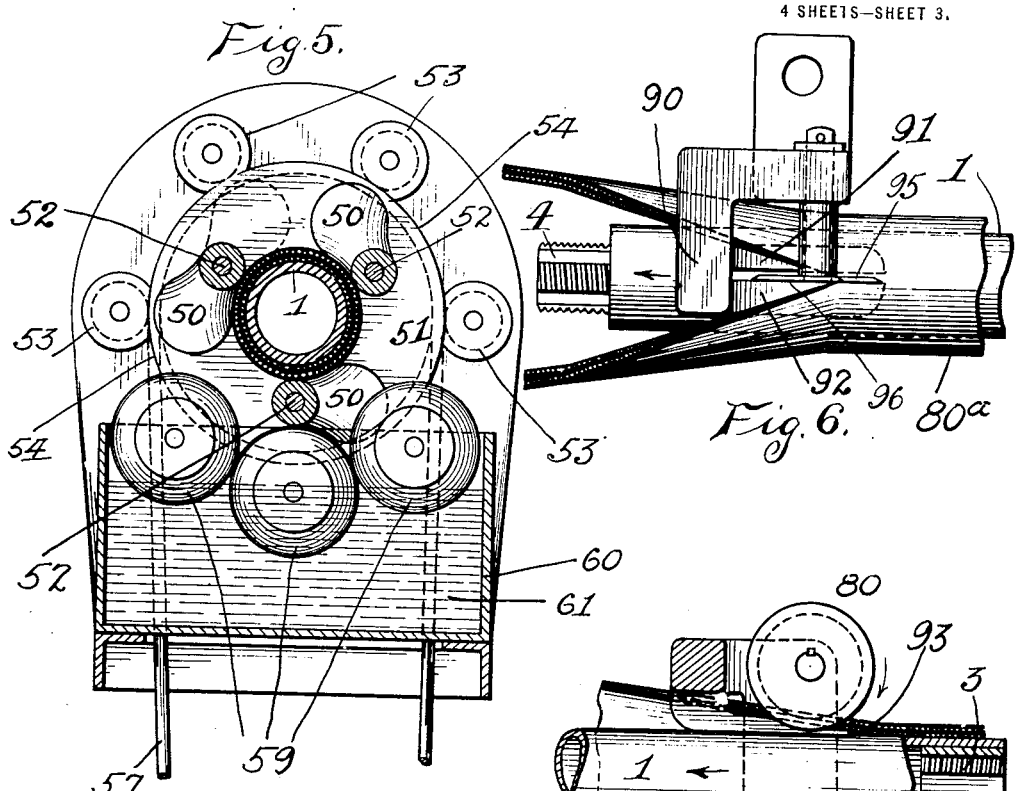
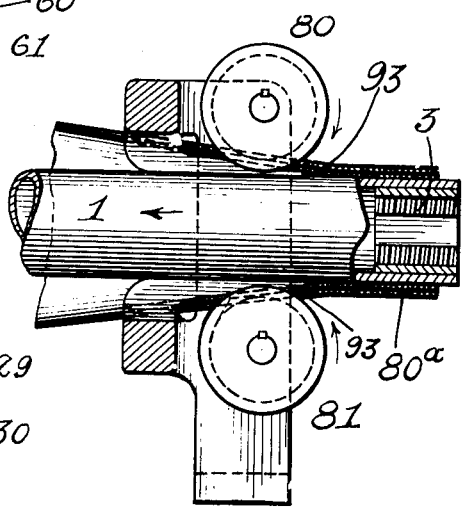
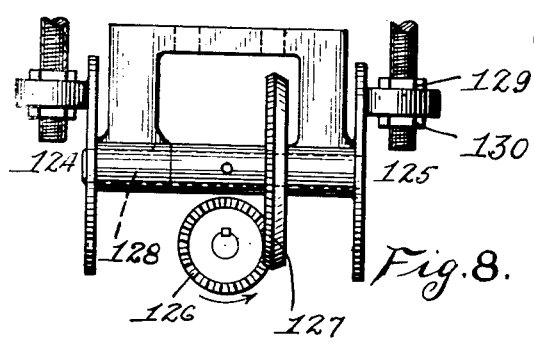
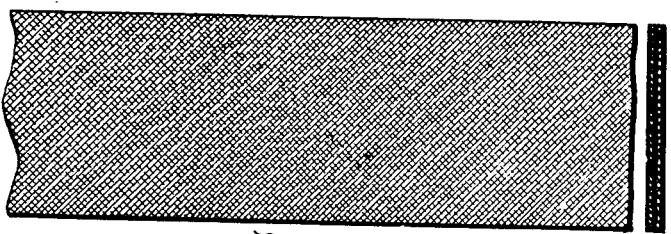
Inventor:
ERLE K. BAKER

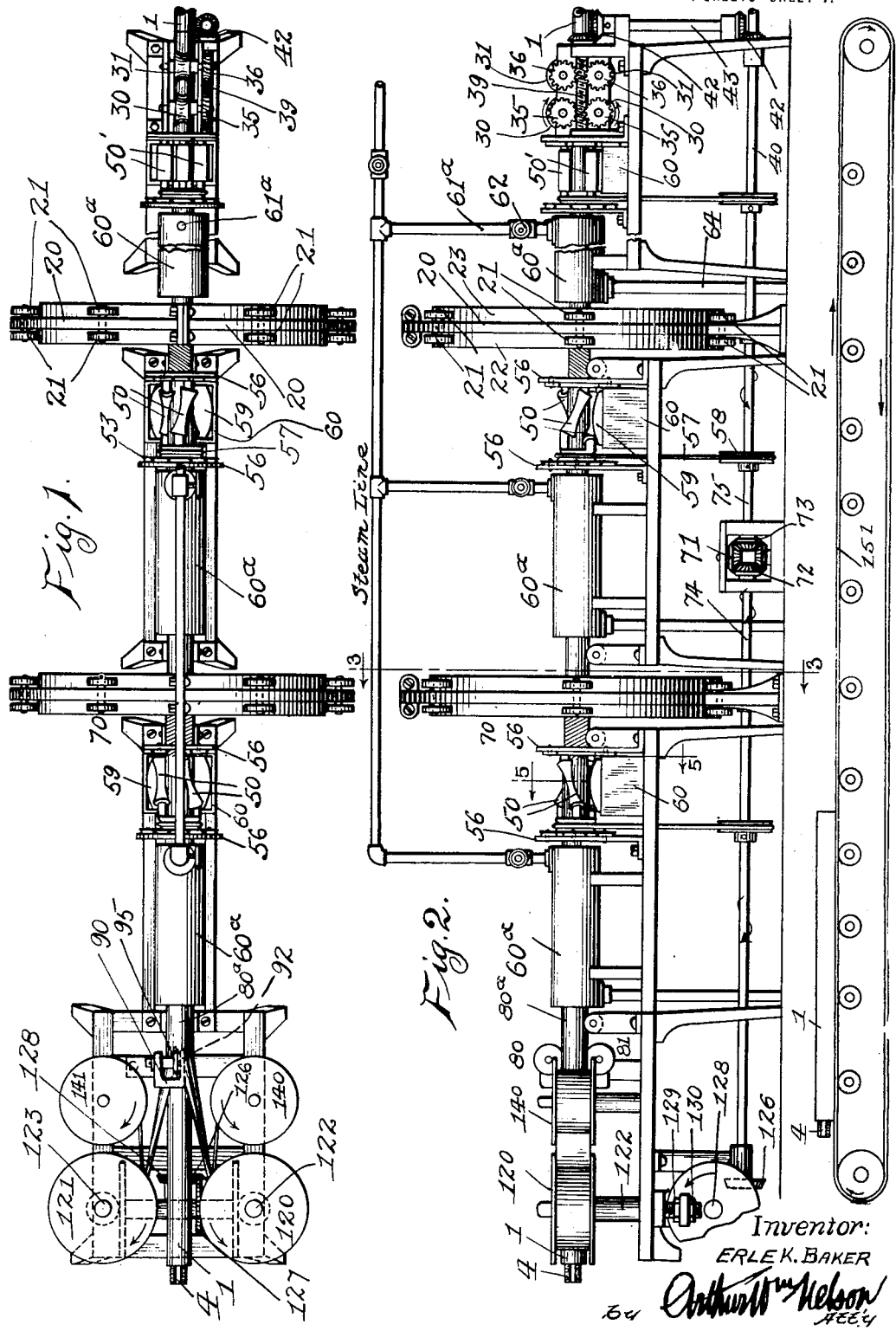

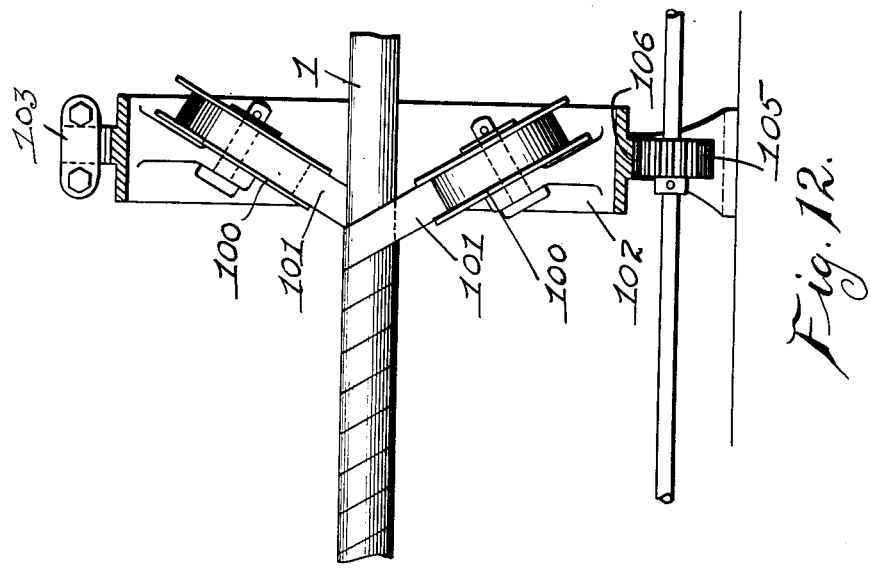
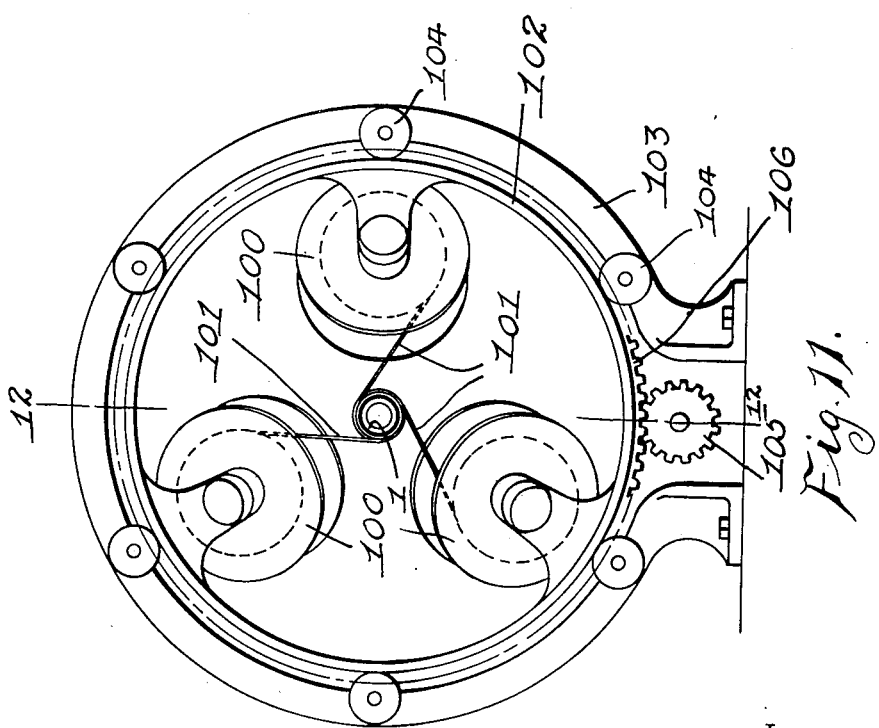

UNITED STATES PATENT OFFICE.

ERLE K. BAKER, OF CHICAGO, ILLINOIS.

METHOD OF AND MEANS FOR PRODUCING TIRE-CARCASS MATERIAL.

1,355,525.  Specification of Letters Patent.  Patented Oct. 12, 1920.

Application filed November 10, 1917. Serial No. 201,276.

*To all whom it may concern:*

Be it known that I, ERLE K. BAKER, a citizen of the United States, and a resident of Chicago, Cook county, Illinois, have invented certain new and useful Improvements in Methods of and Means for Producing Tire-Carcass Material, of which the following is a specification.

There are two general types of tires with respect to the carcass material which they employ, to-wit: the fabric type and the cord type. In the manufacture of the fabric tire it is customary to cut strips of the woven fabric into bias strips by clipping the corners from rectangular sheets and then to apply these bias strips to the tire mold. Because of the bias formation of the strips, it is necessary, in fabric tires, to use several lengths or pieces of fabric to complete one annulus, and this is done by making a lap joint which is objectionable, among other reasons, in that it produces a double thickness of fabric at that point.

The cord type of tire is considered far superior to the fabric type of tire both in durability and resiliency, but involves certain production disadvantages which have heretofore made this type quite expensive. The typical cord tire is produced by laying the cord directly upon the tire mold in superposed layers of diagonally disposed cords. This method of production is slow, laborious, and expensive, and in practice is limited to the use of relatively coarse cords which have proven to be less efficient than smaller cords.

The superiority of the cord type of tire over the fabric type, and the difficulties of production and defects just noted, have led to the practice of making so called cord tire which are, in reality, a fabric tire of a special kind. The fabric, in this instance, instead of being composed of interwoven warp and woof threads of the same size, is composed of warp threads of a size considerably larger than the woof threads; the woof threads serving in this instance merely to hold the material together as a fabric to permit of its being clipped at the corners to provide bias material and to permit manipulation substantially with the same means and by the same methods employed in building the fabric tire. These woof, or cross threads, however, are a positive detriment when embodied in the tire, inasmuch as they, in a measure, serve to cut the warp threads with which they intertwine. This type of tire, however, approaches more nearly the advantages of a typical cord tire than it does the disadvantages of the fabric tire, and for this reason it is called the tire of the cord type.

It is an object of my invention to provide a method of and means for producing tire carcass material of the typical cord type, to-wit: crossed layers of unwoven cords, and to provide a material that can be utilized in the building of a tire under the general method employed in the manufacture of the fabric tire. One of the advantages of such material, over and above its inherent advantage as a typical cord carcass material, lies in the fact that the extensive and often elaborate machinery and equipment of the tire factories may be used with this material. So, also, workmen who have become skilled in the manufacture of tires under former tire-making methods may utilize that skill to a large degree when operating with my material.

A further object of my invention is to provide a method and means for manufacturing cord carcass material continuously; and other objects of my invention are to provide a method and means for manufacturing cord carcass material of improved character, rapidly, at less cost, in less space, in less time, and with less waste than has been possible under methods and means heretofore devised.

My invention consists generally in the steps, acts, and means whereby the above named objects, together with others which will appear hereinafter, are attainable, and my invention will be more readily understood by reference to the accompanying drawings which illustrate that form of my invention which I consider the best at the present time.

In the said drawings—

Figure 1 is a top plan view of mechanism embodying my invention, and of a character suitable for practising my method for producing cord carcass material.

Fig. 2 is a side elevation of the mechanism shown in Fig. 1.

Fig. 3 is an enlarged view substantially on the line 3—3 of Fig. 2.

Fig. 4 is a view of part of the mechanism substantially on the line 4—4 of Fig. 3.

Fig. 5 is an enlarged view of the means for applying liquid rubber to the cord material upon the mandrel, taken substantially on the line 5—5 of Fig. 2.

Figs. 6 and 7 are detail views illustrating the means for severing the cord carcass material for removal from the mandrel.

Fig. 8 is a detail view illustrating the means for driving the spools upon which the finished cord carcass material is wound.

Fig. 9 is a plan view of a portion of the finished cord carcass material.

Fig. 10 is an end view of the strip shown in Fig. 9.

Fig. 11 is a face view of a mechanism for applying strip rubber to the mandrel, and Fig. 12 is a view substantially on the line 12—12 of Fig. 11, part being in section and part in elevation.

The mechanism embodying my invention, as herein disclosed, comprises in all seven principal parts, or it may be divided conveniently into seven principal operations: first, a mandrel of a size such as will permit of the convenient performance of the necessary operations, and which is of sectional construction for purposes which will appear shortly; second, means for moving the mandrel forward at desired speed and against any forces tending to hinder its movement; third, means for applying rubber to the mandrel and to the cords wound upon the mandrel; fourth, heating means for drying or semi-curing the rubber on the mandrel and on the cord carcass material on the mandrel; fifth, means for winding a plurality of cords helically upon the continuously advancing mandrel; sixth, means for severing, into strips, the carcass material enveloping the mandrel; and, seventh, means for winding the strip material onto spools or reels.

*The mandrel.*

The mandrel 1 in this instance is of cylindrical shape and is preferably formed of relatively thin metal throughout substantially all of its extent, the end portions being provided with plugs or annular disks of suitable thickness. As before stated, the mandrel is composed of sections, each section being of convenient length, and one end 2 of each section is provided with a tapped screw threaded opening 3 and the opposite end with a threaded projection 4 adapted to co-act with the screw threaded opening 3 of the adjacent mandrel section. The threaded projection of one mandrel section and the threaded opening of the adjacent mandrel section, in this instance, are of breech lock screw construction, being provided with cut-away portions which permit the insertion of the stud into the opening and the locking of the parts by the relative rotation thereof through a very small angle. Thus, while the mandrel sections are firmly secured together, they may be quickly and readily detached and reunited as is necessary in the operation of the machine. The mandrel in this instance is of such size, cross sectionally considered, that when the carcass envelop is formed thereon it may be cut at diametrically opposite points forming two strips, each strip being of a width such as will extend, when placed upon a tire mold, from one base of the tire to the other. Obviously, by making the mandrel larger, a larger number of strips of proper size may be formed thereon. It will be understood, also, that other means of removably securing the mandrel sections together may be provided, the desired character of the connection being such as will admit of ready separation and rejoining. For example, instead of the mechanical connection here shown, I may unite or removably secure the mandrel sections together magnetically. The surface of the mandrel is preferably highly polished, to the end that the cord carcass material may be readily removed therefrom, and, as will be brought out with reference to the severing means, I am careful to prevent scoring or scratching thereof when the material is cut into strips and removed from the mandrel. Before the mandrel sections reach the first cord winding means, they are preferably provided with a coat of rubber.

*The mandrel forwarding mechanism.*

The mandrel forwarding mechanism, as here shown, comprises a plurality of pairs of upper and lower rolls 30 and 31, having curved faces which embrace a large portion of the mandrel surface. These opposed upper and lower rolls are driven at the desired speed by means of gearing 35 and 36, coacting with the screw shaft 39. The screw shaft 39 is driven from the line drive shaft 40 by means of the bevel gearing 41 and 42 and the vertical shaft 43. It is obvious that by these means the mandrel can be moved longitudinally forward accurately at any desired speed. These driving rolls are provided in such number and with such mandrel contacting faces as to be able to forward the mandrel against all the forces normally tending to prevent the forward movement thereof. In order that the mandrel sections can be readily connected and started into the forwarding mechanism, I may provide one or more supporting or idler rolls just ahead of the forwarding mechanism.

Before the first cord winding or applying mechanism is reached, means are provided to apply a coat of rubber to the mandrel and to dry or semi-cure same, but it is thought that this and the other similar mechanism can be better described later.

*Cord winding mechanism.*

The cord winding mechanism in this instance is designed to lay on or apply simultaneously one hundred cords, but this number, it should be understood, may be more or less, depending upon the size of the cord and the size of the carcass material being formed. The number will usually be in excess of the number shown, which has been chosen for illustrative purposes. The cord is carried, in a floating ring 10, on a plurality of spindles 11 carried upon opposite sides of a depending central flange or rib 12, fifty spools being provided on each side and the spools being staggered with relation to the spools upon the opposite side. Centrally of the ring 10 I provide an annular member 13 which is supported concentrically around the mandrel 1 as by means of the spokes 14 depending from the ring 10. The cords from the various spools extend radially downward, each cord passing through one of the holes 15 in the ring 13. The cords from the spools upon one side of the central flange 12 extend through every other hole, and those upon the other side pass through the intermediate holes. This staggered relation of the cord spools and the passage of the cords through the central spacing ring 13 permits of the use of a large number of spools in a relatively small space.

In starting the machine, the various threads are secured side by side in parallel relation along the mandrel and then movement is imparted longitudinally to the mandrel and rotary motion to the floating ring 10 and spacing ring 13 carried thereby. Thus, as the mandrel moves continuously forward, the cords are laid helically thereon in intimate side by side relation, and, as will be seen shortly, they are consolidated into an adhering mass of somewhat sheet or layer form. The floating ring 10 is driven by means of a pinion 16, carried upon the line shaft 40, which pinion engages an annular rack 18 on the outer face of the ring 10. The ring 10 in this instance is held and guided in proper concentric relation around the mandrel by means of a frame 20 carrying a plurality of rollers 21 which engage the faces 22 and 23 upon opposite sides of the central rack 18.

By varying the relative speeds of the mandrel travel and the rotary travel of the cord carrying ring, the pitch of the winding may be varied as desired.

*Rubber applying means.*

Before the first cords are applied and after the first layer of cords are wound upon the mandrel, it is usually desirable to provide a coat of rubber for the purpose of better consolidating the cord into an adhering mutually tenacious mass which will be able to withstand the strains to which the material will be subjected in the processes of producing the tire, and, thereafter, in use. The cords, it will be understood, are of circular cross section and even when laid side by side they obviously are connected or rather contact only along a relatively small part of their surface, and I prefer to fill in the spaces between respective cords above and below the contacting portions with rubber. I have illustrated two methods of applying rubber for this purpose. The first method consists in applying rubber to the cord material by means of a plurality of rollers 50. The rollers 50 are mounted on pulleylike rings 51 being rigidly but rotatably supported by means of shafts 52 anchored in the rings 51. The rings 51 are arranged for concentric rotation around the mandrel 1 and are suitably guided by a plurality of V-shaped rollers 53, which engage the outer V-shaped edge 54 of the rings. The rollers 53 are rotatably mounted upon stud shafts 55 carried by the ring frame 56. The rings 51 are rotated by means of the belt 57 operating over pulley 58 on the line shaft 40. These rollers 50, of the rubber applying means, positioned after the first cord winding means, are placed at an angle with respect to the longitudinal axis of the mandrel, so that in rolling on and around the mandrel they tend to conform to the path or direction of the helically disposed cords thereon, thus eliminating any danger of the rollers disturbing the properly laid cords. The rollers 50' of the first rubber applying means are shown as cylindrical. As the rollers rotate about the mandrel, they successively engage the rollers 59, mounted for rotation within a receptacle 60 in which is provided a quantity of liquid gum or rubber 61, the rollers 59 extending into this rubber bath. In this manner a film of rubber is picked up by the rolls 59 and transferred to the rollers 53 which in turn apply it to the cord material. Thus an even uniform coating of rubber can be readily applied to the cord material. The rollers 50, in addition to serving as a means for applying rubber to the cords, also act as pressure rollers to press the cords into more intimate side by side contact and to consolidate the rubber and cord into a tenacious sheet or mass.

Instead of applying the rubber to the cord upon the mandrel in the form of a liquid, I may apply it thereto in the form of a thin sheet, which can be pressed into place either by rolls such as those just described or by means of pressure and heat, or, where the sheet form of rubber is provided, I may depend upon the subsequent drying or semi-curing operation to unite the rubber and adjacent cords permanently. The means here shown, (see Figs. 11 and 12) for applying the rubber in sheet form comprises a plurality of spools 100 each carrying a band or ribbon of thin rubber 101, the spools being carried in a cage 102, mounted for concentric rotation around the mandrel by means of frame 103 and rollers 104. As the cage is rotated, by means of pinion 105 engaging rack 106, these ribbons of rubber 107 are wound over the mandrel or over the cords, as the case may be, forming a continuous layer thereon.

Semi-curing means.

After the rubber is placed upon the mandrel and upon the first layer of cord wound upon the mandrel, it is desirable to semi-cure or dry the rubber, i. e.: vaporize the solvent, to increase its cohesive qualities. To this end, I provide a long steam drum 60$^a$, which surrounds the mandrel and having its inner walls in close proximity thereto. Steam is admitted to the steam drum by means of a steampipe 61$^a$ and control valve 62, and the water of condensation can be removed through and by means of the drain 64 and valve 65. The length of the steam drum is such that as the cord carcass material upon the mandrel passes therethrough it will be properly dried or semi-cured upon its emergence. A number of the steam drums 60$^a$ are provided as shown.

Second cord winding mechanism.

Following the first heading or semi-curing means, I wind the first layer of cord upon the mandrel and following the second heating means I wind another layer of cord upon the layer already on the mandrel, but helically disposed to cross, in unwoven relation, the threads of the first layer, and I then apply rubber thereto, roll, and semi-cure the product in the manner already described with reference to the application of the first layer of cord. The ring 70 for laying on the second layer of cord is alike in all respects to the ring already described, but is rotated in an opposite direction around the mandrel, thus obviously laying the cords thereon in crossed relation relative to the first layer. The opposite rotation of the two rings is secured by means of the interposition of an idler 71 between the gears 72 and 73 mounted upon shafts 74 and 75, (see Fig. 2).

After the second layer of cords is applied and rubberized and rolled, the two layers adhere together very strongly and in effect form a single layer or unitary structure such that all the acts of stretching and shaping that may be necessary in the building of the tire upon the tire molds may be performed without danger of separating the various cords of the carcass material.

Severing means.

As stated in the opening of the specification, it is an object of my invention to provide a cord carcass material which can be manipulated in substantially the same way and with the equipment generally employed in the manufacture of fabric tires. To this end, I sever the envelop or tube of cord carcass material longitudinally to form substantially endless strips of material which can be conveniently shaped around the tire mold, and, inasmuch as under the present method the cord carcass material is formed continuously, strips of any desired lengths may be secured, with the resultant advantage that a strip of a length sufficient to extend completely around the mold may be cut off, thus eliminating the aforementioned objectionable overlapping of the bias strip and the incidental labor and expense.

In this instance, the cord carcass tube or envelop 80$^a$ is of such size, cross sectionally considered, as to be adapted to form two widths of tire carcass material, and, for this reason, I cut the tube or envelop into two parts, providing a cutter 80 above and a similar cutter 81 below. I might here add that it is desirable to maintain the surfaces of the mandrel perfectly smooth, and, for this reason, I have devised mechanism for cutting and removing the material from the mandrel without scoring or injuring the mandrel in any way. After the last layer of cord carcass material is placed upon the mandrel and the pressure rolls are rotated around the same and the material thus treated is passed through the drier or semi-curer, it has become somewhat loosened from the mandrel, due to the rolling action of the rollers against the smooth hard mandrel, and the expanding action of the drying or semi-curing operation. Each of the cutting devices is of the same construction, and a description of one will serve for both. The cutting or severing means comprises in this instance an arm 90, carrying a pair of spaced fingers 91 and 92, the ends of which are beveled as at 93, thereby forming a plow or inclined plane which lifts the already somewhat loose cord carcass material away from the mandrel. The continued forward movement of the mandrel and cord material causes the material to engage a rotary cutter 95, co-acting with the edge 96 of the finger 92, thus completely severing the material without in any wise injuring the surface of the mandrel.

Cord carcass strip removing means.

The severed cord carcass material in the form of strips is now wound upon spools 120 and 121 which are carried on shafts 122 and 123 and which are suitably driven by means of the friction driving mechanism 124 and 125. The friction mechanism is given motion through bevel gearing 126 and 127 and shaft 128. In this manner the strip is put under tension and a slight outward pull is exerted on the strip. Thus the cutting and loosening operation is assisted.

The friction drive speed may be regulated by means of nuts 129 and 130.

As these strips of cord carcass material are very sticky in this condition, it is necessary to insulate the respective layers of the material on the spools 120 and 121, and this I do by providing spools 140 and 141 on which are wound ribbons of untreated cotton fabric which ribbons pass from the spools 140 and 141 to the spools 120 and 121, being wound thereon with the cord carcass material.

*Return of mandrel sections for reëntry.*

As the mandrel sections are successively freed from the cord carcass materal they are detached, which can be readily done by a slight rotation because of the breech screw construction, and are returned to the starting end of the machine. To this end, I prefer to provide a conveyer or traveling belt 150 operating over suitable rollers 151 as indicated, upon which the mandrel sections can be placed and automatically returned to the starting end.

*Conclusion.*

The herein described method and means and the material resultant therefrom is a marked improvement over prior methods and means and provides a true cord carcass material which can be manipulated in the tire manufacturing processes with as much ease and freedom as a piece of woven fabric, and when incorporated in the tire may even be superior to the cord tire of the type in which the cords are wound or placed directly upon the tire mold in the process of manufacture, inasmuch as, under such methods in practice they are limited to the use of relatively coarse cords, whereas, under the present method and means, cords of any desired size may be employed and they will preferably be somewhat smaller than the cords heretofore wound upon the tire mold, which smaller cords are admittedly stronger, more resilient and in every respect better adapted to withstand service conditions than are the coarser cords.

I claim:

1. The method of manufacturing cord carcass material of substantially endless strip form, which consists in continuously forming a plurality of cords helically about a mandrel to form an enveloping layer of cord carcass material, moving the material and mandrel forward, applying roller pressure to the material on the mandrel rotatably around its axis, forming a plurality of cords helically upon the cord carcass material on the mandrel so disposed thereon as angularly to cross the cords of the first layer and pressure rolling the cord carcass material and severing it longitudinally to convert it to strip form.

2. The method of manufacturing cord carcass material which consists in continuously forming a plurality of cords helically about an advancing mandrel to form an enveloping layer of cord carcass material thereon, applying rubber to the cord carcass material, applying heat thereto to semi-cure the material, forming another plurality of cords helically upon the mandrel carried cords and so disposed thereon as angularly to cross the cords thereof, applying rubber to the second enveloping layer thus formed, applying heat to semi-cure it, and severing the superposed layers of cord carcass material to convert to strip form.

3. The method of manufacturing cord carcass material which consists in setting a sectional mandrel in motion and while in motion winding a plurality of cords helically thereon in side by side and non-overlapping relation to form an enveloping tube of cord carcass material thereon, applying rubber to the envelop thus formed, severing the material longitudinally, removing the severed fabric to free the mandrel, removing the mandrel sections as they are freed, and reattaching them successively to the sectional mandrel preceding the winding point.

4. The method of manufacturing cord carcass material which consists in setting a sectional mandrel in motion and while in motion applying a coat of rubber thereto, winding a plurality of cords helically thereon in side by side and non-overlapping relation to form an enveloping tube of cord carcass material thereon, severing the material longitudinally to convert same to strip form, removing the severed fabric to free the mandrel, removing the mandrel sections as they are freed, and reattaching them successively to the sectional mandrel preceding the winding point.

5. The method of manufacturing cord carcass material which consists in setting a sectional mandrel in motion, and while in motion applying a coat of rubber thereto, semi-curing the rubber on the mandrel, winding a plurality of cords helically thereon in side by side and non-overlapping relation to form an enveloping tube of cord carcass material thereon, severing the material longitudinally to convert same to strip form, removing the severed fabric to free the mandrel, removing the mandrel sections as they are freed, and reattaching them successively to the sectional mandrel preceding the winding point.

6. The method of manufacturing cord carcass material which consists in setting a sectional mandrel in motion and while in motion winding a plurality of cords thereon helically in side by side and non-overlapping relation to form an enveloping tube of cord carcass material thereon, pressure rolling the material thus formed on the mandrel, severing the material longitudinally to convert same to strip form, removing the severed fabric to free the mandrel, removing the mandrel sections as they are free, and reattaching them successively to the sectional mandrel preceding the winding point.

7. A continuous cord carcass mill adapted to convert a plurality of cords into strips of cord carcass material, having superposed layers of crossed unwoven cords, comprising a mandrel, mandrel forwarding means, rubber applying means, semi-curing means, helical cord winding means and longitudinal severing means, arranged in operative alinement and simultaneously coöperating to set and maintain the mandrel in motion longitudinally and without interrupting such motion progressively applying rubber to the mandrel, winding a plurality of cords helically about said rubberized mandrel to form a tubular envelop, rubberizing the envelop, semi-curing the envelop, and finally severing the envelop longitudinally to form strips of desired width.

8. A continuous cord carcass mill adapted to convert a plurality of cords into strips of cord carcass material having superposed layers of crossed unwoven cords, comprising a mandrel, mandrel forwarding means, a plurality of spaced rubber applying means, a plurality of helical cord winding means, longitudinal severing means, and tension winding means, arranged in operative alinement and simultaneously coöperating to set and maintain the mandrel in motion longitudinally and without interrupting such motion progressively applying rubber to the mandrel, winding a plurality of cords helically about the mandrel to form a tubular envelop, rubberizing the envelop, winding a plurality of cords helically about the envelop and so disposed thereon as to cross same, rubberizing the cords thus applied, severing the tubular envelop longitudinally to form strips of desired width, and tensionally winding said strips upon spools.

9. The step in the method of manufacturing cord carcass material of strip form which consists in severing the cord carcass tubular envelop upon a mandrel by first moving the envelop away from the mandrel and while in this condition severing the envelop longitudinally to convert it to strip form to form strips of desired width.

10. The herein described means for forming cord carcass material of strip form, comprising means for forming an envelop of tire carcass material upon a mandrel and a cutting mechanism formed with a finger adapted to lift the material away from the mandrel, and a cutting element coöperating with the finger to sever the envelop.

11. A continuous cord carcass mill adapted to convert a plurality of cords into strips of cord carcass material, having superposed layers of crossed unwoven cords, comprising a mandrel, a mandrel forwarding means, rubber applying means, semi-curing means, helical cord winding means, pressure rolling means adapted for rotation around the axis of the mandrel and at an angle thereto and longitudinal severing means, arranged in operative alinement and simultaneously coöperating to set and maintain the mandrel in motion longitudinally and without interrupting such motion progressively applying rubber to the mandrel, winding a plurality of cords helically about said rubberized mandrel to form a tubular envelop, pressure rolling the envelop, rubberizing the envelop, semi-curing the envelop, and finally severing the envelop longitudinally to convert it to strip form.

In witness whereof I have hereunto set my hand this 3rd day of November, A. D. 1917.

ERLE K. BAKER.